E. H. NEGLEY.
DISTRIBUTION BOX.
APPLICATION FILED MAY 24, 1917.
1,259,766.
Patented Mar. 19, 1918.
2 SHEETS—SHEET 1.
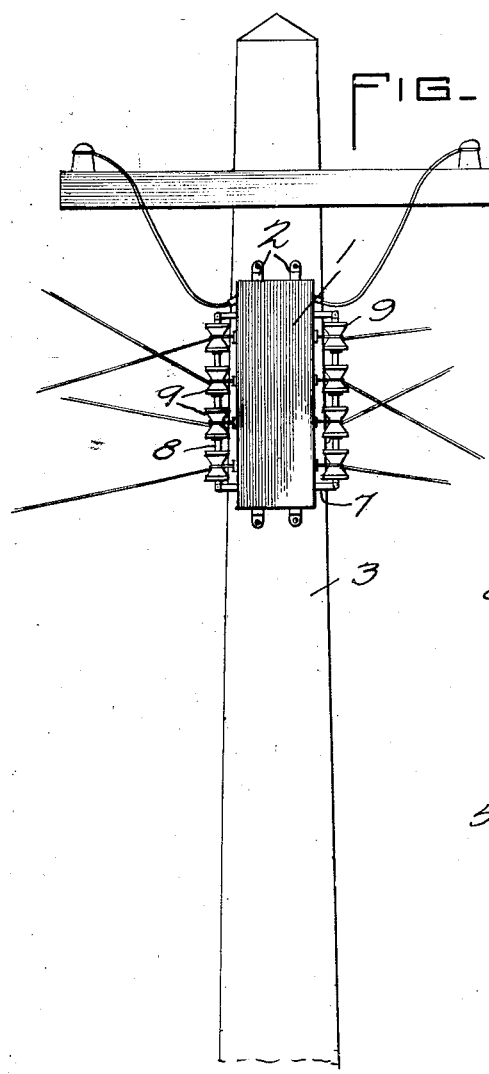
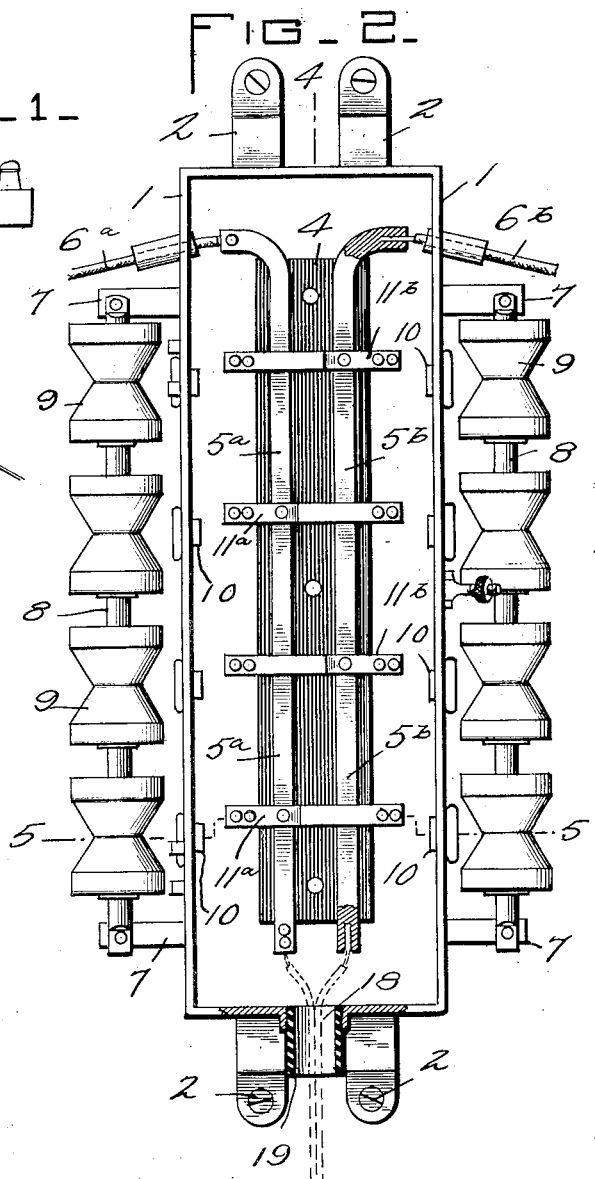
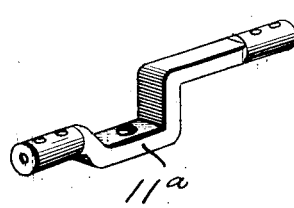
WITNESSES
INVENTOR
EARL H. NEGLEY,
BY
ATTORNEYS

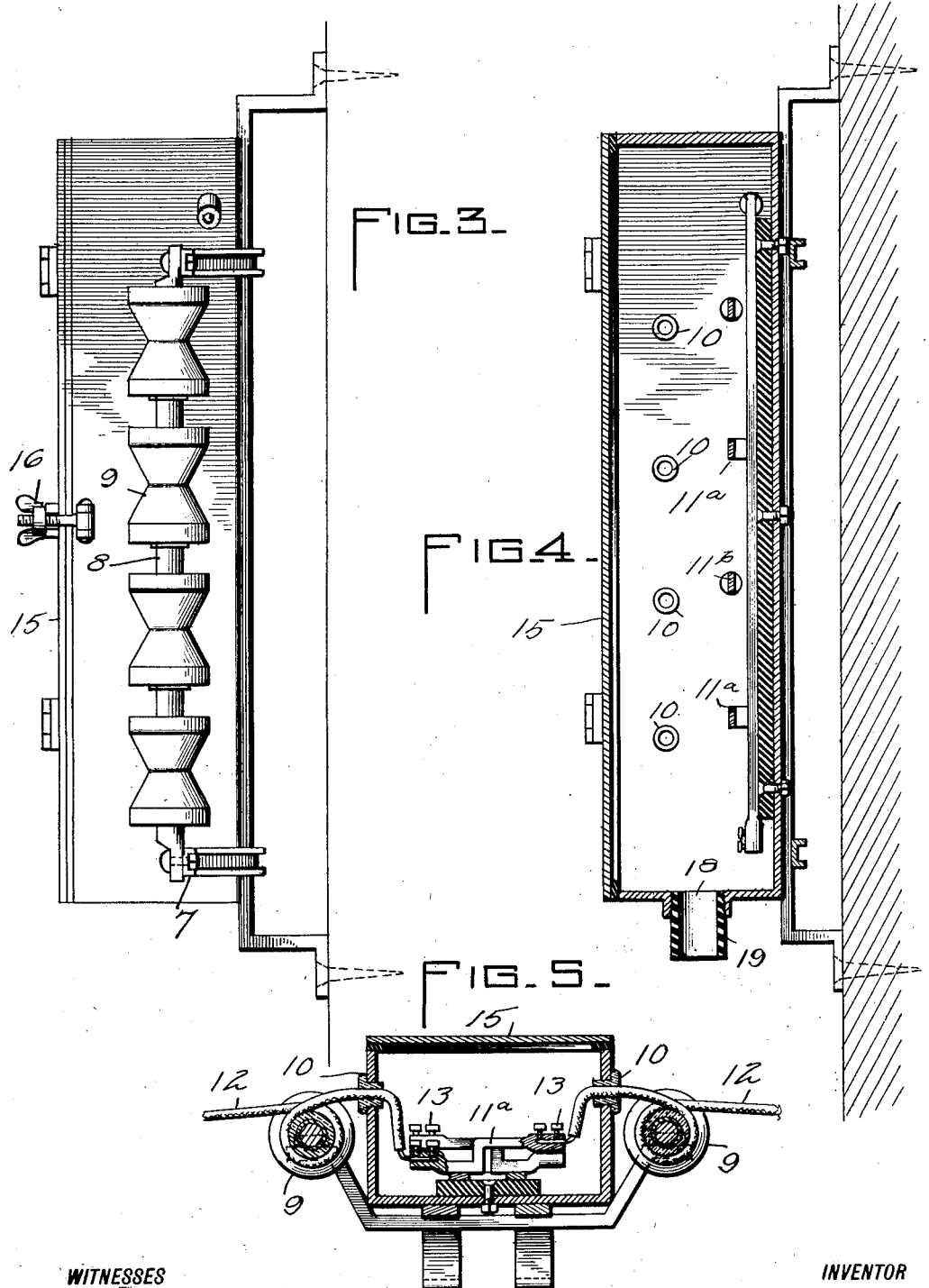

UNITED STATES PATENT OFFICE.

EARL H. NEGLEY, OF CANTON, ILLINOIS.

DISTRIBUTION-BOX.

1,259,766.  Specification of Letters Patent.  Patented Mar. 19, 1918.

Application filed May 24, 1917. Serial No. 170,691.

*To all whom it may concern:*

Be it known that I, EARL H. NEGLEY, a citizen of the United States, and a resident of Canton, in the county of Fulton and State of Illinois, have invented a new and useful Improvement in Distribution-Boxes, of which the following is a specification.

My invention relates to distribution boxes for use in connection with electric light and power service, and it consists in the combinations, constructions and arrangements herein described and claimed.

An object of my invention is to provide a distributing box which may be fastened to a pole and by means of which the connection of the individual wires leading to the various customers' residences or stores may be quickly and effectively made.

A further object of my invention is to provide a device of the type described which will eliminate the strain ordinarily placed on the main supply wires and at the same time providing a construction by means of which a customer's branch wires may be quickly connected or disconnected.

A further object of my invention is to provide a distributing box which is composed of few parts, these parts being securely made and forming an effective means for quickly and securely connecting the branch wires with the main supply wires for either permanent or temporary connection.

Other objects and advantages will appear in the following specification and the novel features of the invention will be particularly pointed out in the appended claims.

My invention is illustrated in the accompanying drawings, forming part of this application, in which Figure 1 is a side view of a pole to which my improved distributing box is attached, Fig. 2 is a face view of the box, the cover being removed, Fig. 3 is a side view of the box, Fig. 4 is a section on the line 4—4 of Fig. 2, Fig. 5 is a section on the line 5—5 of Fig. 2, Fig. 6 is a perspective view of the connecting devices.

In carrying out my invention I provide an elongated box or casing 1 which is preferably made of metal and which is provided with ears or lugs 2 at the opposite ends by means of which the box may be secured to the pole 3.

Disposed in the box is a central insulating base 4 which is provided with bus bars $5^a$ and $5^b$ respectively, these bus bars extending substantially the length of the box and being connected at either end to the main supply wires $6^a$ and $6^b$ respectively. These latter wires are preferably low voltage wires which come from the secondaries of the transformer. Secured to the sides of the box or casing 1 are brackets 7, these brackets bearing rods 8 upon which are supported a series of insulators 9. The central portion of these insulators are opposite openings in the box 1, which openings are provided with insulating sleeves 10. Secured to the bus bars $5^a$ is a series of connectors like that shown at $11^a$ in Fig. 6. A similar series of connectors $11^b$ is secured to the bus bar $5^b$.

It will be observed that the connectors $11^a$ have a portion which crosses but does not touch the bus bar $5^b$ while the connectors $11^b$ have similar portions which cross but do not touch the bus bar $5^a$. The means for connecting the branch wires to the customers' houses or stores is best shown in Fig. 5. It will be seen that branch wires 12 pass around the insulators 9, the ends passing through the sleeves 10 and being secured in the ends of the connecting devices $11^a$ by means of set screws 13.

In the illustration I have shown the two lower insulators as being opposite the sleeves 10 in position for connecting with the connecting device $11^a$ which is secured to the bus bar $5^a$. The next pair of insulators above are in position for supporting a wire which is to be connected to the bus bar $5^b$. Obviously there might be as many such connectors as desirable. In the present instance the box is to be used with a two-wire system, but it is obvious that a box for a three-wire or four-wire system similarly equipped might be used by adding other bus bars, connectors and insulators.

In order to protect the casing 1 I provide a hinged door 15 provided with a latch 16 of the type shown in Fig. 3, making the box weather-proof.

From the foregoing description of the various parts of the device, the operation thereof may be readily understood.

When it is desired to disconnect any customer all that is necessary is to unloosen the set screws 13 and take out the ends of the wires. The wires need not even be detached from the insulators 9. The set screws 13 will effect a good connection and this obviates the necessity of soldering the branch service wires to the main supply wires. It eliminates the strain on the main supply wires. By the use of the box, a neater, better and more systematic installation can be. made, thereby improving the general appearance of the pole line connections.

In order to provide for underground distribution service an opening 18 is provided in the bottom of the box having an insulating sleeve or bushing 19 by means of which the wires from the underground conduits may enter the distribution box.

I claim:—

1. A distributing box comprising a casing, an insulating base secured to said casing, bus bars carried by the base, said casing being provided with a series of openings on each side thereof, insulating sleeves for said openings, a pair of laterally extending brackets carried by the casing on opposite sides thereof, a rod connected at each end to a bracket, a plurality of insulators carried by each of the rods, each of said insulators being opposite one of said insulating sleeves, and clamping devices secured to said bus bars on the inside of the casing adjacent to each of said sleeves.

2. A distributing box comprising a casing, an insulating base secured to said casing, bus bars carried by the base, said casing being provided with a series of openings on each side thereof, insulating sleeves for said openings, brackets carried by said casing on opposite sides thereof, a series of insulators carried by each of said brackets, each of said insulators being opposite one of said insulating sleeves and clamping devices secured to said bus bars on the inside of the casing adjacent to each of said sleeves.

3. A distributing box comprising a casing, an insulating base secured to the bottom of the casing on the inside thereof, bus bars carried by said insulating base, said casing being provided with a series of openings in its opposite sides, brackets carried by the casing on the opposite sides, a series of insulators carried by each of said brackets, each of said insulators being opposite one of said openings, an insulating sleeve for each opening, connectors secured to one of said bus bars, said connectors passing the other bus bar by being spaced from it, connectors secured to the second bus bar and passing the first named bus bar but being spaced from said first named bus bar, the ends of each of said connectors being disposed in close proximity to certain of said openings.

4. A distributing box comprising a casing, an insulating base secured to said casing, bus bars carried by the base, said casing being provided with a series of openings on each side thereof, insulating sleeves for said openings, a pair of laterally extending brackets carried by the casing on opposite sides thereof, a rod connected at each end to a bracket member, a plurality of insulators carried by each of the rods, each of said insulators being opposite one of said insulating sleeves, clamping devices secured to said bus bars on the inside of the casing adjacent to each of said sleeves, said clamping devices comprising a series of Z-shaped conductors having set screws at their ends, adjacent conductors being secured to different bus bars, and opposite conductors being secured to the same bus bars.

EARL H. NEGLEY.

Witnesses:
R. S. MULLINS,
JOHN M. MOORE.